United States Patent
Shah et al.

(10) Patent No.: US 9,955,387 B1
(45) Date of Patent: Apr. 24, 2018

(54) MANAGEMENT OF MODULATION FOR TRANSMISSION OF DATA IN ANTICIPATION OF HANDOVER

(71) Applicant: Sprint Spectrum L.P., Overland Park, KS (US)

(72) Inventors: Maulik K. Shah, Overland Park, KS (US); John W. Prock, Raymore, MO (US); Jasinder P. Singh, Olathe, KS (US); Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1057 days.

(21) Appl. No.: 13/896,058

(22) Filed: May 16, 2013

(51) Int. Cl.
*H04W 36/00* (2009.01)

(52) U.S. Cl.
CPC ............. *H04W 36/0055* (2013.01)

(58) Field of Classification Search
CPC ............ H04L 1/0025; H04L 1/0026; H04W 36/0016; H04W 36/0023; H04W 36/0026; H04W 36/14; H04W 36/30; H04W 72/1231
See application file for complete search history.

(56) References Cited

U.S. PATENT DOCUMENTS

| | | | | |
|---|---|---|---|---|
| 2002/0036992 A1* | 3/2002 | Balachandran | ....... | H04L 1/0003 370/329 |
| 2002/0172208 A1* | 11/2002 | Malkamaki | ........... | H04L 1/0083 370/400 |
| 2006/0007889 A1* | 1/2006 | Khan | .................... | H04W 36/18 370/331 |
| 2006/0276191 A1* | 12/2006 | Hwang | ................. | H04W 36/30 455/436 |
| 2007/0071145 A1* | 3/2007 | Perets | ........................... | 375/346 |
| 2007/0286124 A1* | 12/2007 | Grant et al. | .................. | 370/331 |
| 2008/0051125 A1* | 2/2008 | Muharemovic | ... | H04W 72/1231 455/519 |
| 2008/0267302 A1* | 10/2008 | Cai | ....................... | H04L 1/0027 375/260 |
| 2009/0185577 A1* | 7/2009 | Kishiyama et al. | .......... | 370/465 |
| 2010/0035581 A1* | 2/2010 | Park et al. | ................. | 455/412.1 |
| 2010/0091739 A1* | 4/2010 | Dayal | ................... | H04L 1/0026 370/332 |

(Continued)

OTHER PUBLICATIONS

TSG-RAN Working Group 1 #20, R1-01-0587 "System Performance Comparison of Chase Combining and Adaptive IR for HSDPA" May 22-25, 2001. pp. 1-12. Lucent Technologies.*

(Continued)

*Primary Examiner* — Xavier Wong (57) ABSTRACT

A method of managing modulation for transmission of data in anticipation of handover. When a source base station is serving a UE and determines that the UE is going to hand over to a target base station, the source base station automatically transitions to transmit data to the UE with a low-order MCS selected without regard to CQIs reported by the UE, or at least to apply an MCS corresponding with a CQI lower than that reported by the UE. By applying a low-order MCS to transmit data to the UE, the source base station may increase the likelihood that the data will arrive successfully at the UE, as the low-order MCS may be more tolerant to noise than higher-order MCSs.

20 Claims, 6 Drawing Sheets

(56) References Cited

U.S. PATENT DOCUMENTS

| | | | |
|---|---|---|---|
| 2010/0093386 A1* | 4/2010 | Damnjanovic et al. | 455/522 |
| 2010/0111036 A1* | 5/2010 | Iwamura | H04W 36/02 370/331 |
| 2010/0226340 A1* | 9/2010 | Tayloe | H04W 36/30 370/332 |
| 2011/0299393 A1* | 12/2011 | Almutairi | H04L 47/10 370/235 |
| 2012/0163248 A1* | 6/2012 | Chin | H04W 36/14 370/280 |
| 2013/0195042 A1* | 8/2013 | Taori | H04W 72/042 370/329 |
| 2013/0225175 A1* | 8/2013 | Obuchi | H04B 7/15507 455/436 |
| 2013/0252660 A1* | 9/2013 | Bach | H04W 52/0206 455/525 |
| 2014/0016617 A1* | 1/2014 | Froberg Olsson | H04W 36/00 370/331 |
| 2014/0301354 A1* | 10/2014 | Davydov | H04W 76/00 370/330 |
| 2014/0334293 A1* | 11/2014 | Narasimha | H04W 28/08 370/229 |
| 2016/0119762 A1* | 4/2016 | Zhu | H04W 72/042 370/312 |

OTHER PUBLICATIONS

Mustafa Ismael Salman et al. "CQI-MCS Mapping for Green LTE Downlink Transmission" Proceedings of the Asia-Pacific Advanced Network 2013 v. 36, p. 74-82.*

"3GPP TS 36.331 V9.3.0" 3GPP Organizational Partners, Jun. 2010.*

A. Roessler et al. "Rohde & Schwarz LTE-Advanced (3GPP Rel.12) Technology Introduction" Jun. 2014.*

Tero Henttonen et al. "Performance of VoIP with Mobility in UTRA Long Term Evolution" 2008, p. 2492-2496.*

* cited by examiner

Fig. 1

| CQI index | modulation | code rate x 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

MANAGEMENT OF MODULATION FOR TRANSMISSION OF DATA IN ANTICIPATION OF HANDOVER

BACKGROUND

Unless otherwise indicated herein, the materials described in this section are not prior art to the claims and are not admitted to be prior art by inclusion in this section.

A cellular wireless network may include a number of base stations that radiate to define wireless coverage areas, such as cells and cell sectors, in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or a packet-switched network such as the Internet for instance. With this arrangement, a UE within coverage of the network may engage in air interface communication with a base station and may thereby communicate via the base station with various remote network entities or with other UEs.

A cellular wireless network may operate in accordance with a particular air interface protocol, with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA) (e.g., Long Term Evolution (LTE) or Wireless Interoperability for Microwave Access (WiMAX)), Code Division Multiple Access (CDMA) (e.g., 1xRTT and 1xEV-DO), iDEN, TDMA, AMPS, GSM, GPRS, UMTS, EDGE, MMDS, WIFI, and BLUETOOTH. Each protocol may define its own procedures for registration of UEs, initiation of communications, handover between coverage areas, and functions related to air interface communication.

In accordance with the air interface protocol, each coverage area may operate on one or more carrier frequencies and may define a number of air interface channels for carrying information between the base station and UEs. These channels may be defined in various ways, such as through frequency division multiplexing, time division multiplexing, and/or code-division multiplexing for instance.

By way of example, each coverage area may define a pilot channel, reference channel or other resource on which the base station may broadcast a pilot signal, reference signal, or the like that UEs may detect as an indication of coverage and may measure to evaluate coverage strength. As another example, each coverage area may define one or more uplink control channels or other resources on which UEs may transmit control messages to the base station. And each coverage area may define one or more downlink control channels or other resources on which the base station may transmit control messages to UEs. Each coverage area may then define one or more traffic channels or other resource for carrying communication traffic such as voice data and other data between the base station and UEs.

When a UE is operating in an active (e.g., connected) mode within coverage of a particular base station, the base station may receive a sequence of data from the network infrastructure for transmission over the air to the UE. As the base station receives that data, the base station may process the data through various layers of a protocol stack, ultimately modulating the data onto one or more carrier frequencies for transmission to the UE.

In an LTE network for instance, as the base station receives Internet Protocol (IP) packets for transmission to the UE, the base station processes the packets in a Packet Data Convergence Protocol (PDCP) layer to remove the relatively large IP packet headers and add token PDCP headers in their place, producing PDCP Protocol Data Units (PDUs). The base station then processes the PDCP PDUs in Radio Link Control (RLC) layer, segmenting the PDCP PDUs into a sequence of RLC PDUs with RLC headers. In turn, the base station then processes these RLC PDUs in a Medium Access Control (MAC) layer, which adds to each RLC PDU a MAC header and appropriate padding to fit the PDU into air interface transport blocks (e.g., 1 millisecond transmission time intervals) and manages output of the transport blocks to a physical layer for modulation and transmission in air interface subframes to the UE. Further, the MAC layer may engage in a hybrid automatic repeat request (HARD) process through which the MAC layer repeats transmission of data segments to the UE, incrementally adding error correction coding until the UE successfully receives the data.

As the UE receives this data transmitted from its serving base station, the UE may regularly monitor base station channel quality and provide the base station with channel quality reports, which the base station may then use as a basis to adjust data transmissions to the UE. For instance, the UE may regularly evaluate a signal-to-noise ratio and/or signal strength of the base station's pilot or reference signal and may periodically transmit to the base station a Channel Quality Index (CQI) based at least in part on that evaluation. As the base station receives these CQIs from the UE, the base station may then adjust characteristics of its data transmission to the UE based on the received CQIs, such as by selecting and applying a particular Modulation and Coding Scheme (MCS) corresponding with the latest received CQI.

At the same time, as the UE is being served in an active mode by a particular base station, the UE may also regularly monitor channel quality of one or more other base stations in the UE's vicinity, to determine whether handover to another base station may be appropriate. In particular, the UE may similarly evaluate signal-to-noise ratio and/or signal strength of the pilot or reference signal of each such other base station (or may do so at the direction of its serving base station), and the UE may determine whether that channel quality is threshold high (perhaps threshold higher than the channel quality from the UE's serving base station). If so, the UE may then signal to its serving base station to request handover to the other base station, and the serving base station may orchestrate the handover.

When an active UE hands over from one base station to another, i.e., from a source base station to a target base station, the network infrastructure may transition to sending data for the UE to the target base station for transmission over the air to the UE. Further, in some systems, to the extent the source base station has already received data for transmission to the UE, the source base station may transfer at least a portion of that data to the target base station so that the target base station can transmit that data over the air to the UE. In an LTE network, for instance, to the extent the source base station has data buffered in its RLC layer (pending transfer to the MAC layer), the source base station may transfer that data over an inter-base-station interface ("X2 interface) to the target base station for transmission to the UE. Once the UE receives that transferred data, then UE may then continue to receive additional data that the target base station receives from the network infrastructure for transmission to the UE.

Overview

Unfortunately, in some systems, when a UE hands over from one base station to another, the source base station may not transfer to the target base station some (or all) of the data that the source base station has received for transmission over the air to the UE. By way of example, in an LTE network, although the source base station may transfer to the target base station data that the source base station has buffered in its RLC layer, the source base station may not transfer to the target base station certain data that the source base station has buffered in its MAC layer, such as data that the source base station has buffered in an HARQ buffer for transmission to the UE. Consequently, when an active UE in such a system hands over from the source base station to the target base station, the UE may not receive that data, which may cause performance and user experience issues.

Disclosed herein is a method and system to help overcome this problem. In accordance with the disclosure, when a source base station is serving a UE and determines that the UE is going to hand over to a target base station, the source base station will automatically transition to transmit data to the UE with a low-order MCS selected without regard to CQIs reported by the UE, or at least to apply an MCS corresponding with a CQI lower than that reported by the UE. In practice, for instance, until this handover determination is made, the source base station may regularly select and apply an MCS based on a CQI most recently received from the UE. But once the source base station makes the handover determination, the source base station may switch by rote to apply a particular low-order MCS, perhaps that corresponding with the lowest possible CQI, rather than selecting the MCS based on any CQI(s) reported by the UE.

By applying a low-order (perhaps the lowest-order) MCS to transmit data to the UE, the source base station may increase the likelihood that the data will arrive successfully at the UE, as the low-order MCS may be more tolerant to noise than higher-order MCSs. By way of example, in an LTE network, the source base station may be configured to determine that the UE is going to hand over to a target base station and to responsively begin applying Quadrature Phase Shift Keying (QPSK) with a coding rate less than 0.08, even though the CQI most recently reported by the UE corresponds with a higher-order MCS, such as QPSK with a coding rate greater than 0.4 or perhaps 16 Quadrature Amplitude Modulation (16-QAM) or even 64-QAM. In general, the lower-order MCS may allow for transmission of fewer bits per symbol than a higher-order MCS, but the lower-order MCS may also be less susceptible to noise than the higher-order MCS. Thus, the lower-order MCS may more reliably deliver buffered data to the UE.

Accordingly, in one respect, disclosed is a method operable by a first base station, including (i) determining that a UE is going to hand over from being served by the first base station to being served by a second base station and (ii) responsive to the determining, transmitting data to the UE with an MCS different than an MCS that the first base station associates with a CQI that the first base station most recently received from the UE. For instance, given a table that maps CQIs to MCSs, ranging from a lowest-level CQI mapped with a lowest-order MCS to a highest-level CQI mapped with a highest-level MCS, the first base station may by rote select and apply the lowest-order MCS for transmission of data to the UE, even though the UE may have most recently reported a CQI that the table associates with a higher-order MCS.

In another respect, disclosed is a method similarly operable by a first base station. In accordance with the method, the first base station receives and stores data in a buffer for transmission from the buffer to a UE served by the first base station. Further, the first base station regularly receives channel quality reports from the UE, and, for each of a plurality of sequential transmissions to the UE from the buffer, the first base station applies an MCS selected by the first base station based on one or more of the received channel quality reports. In that context, the first base station then determines that the UE is going to hand over from being served by the first base station to being served by a second base station. And responsive to making that determination, the first base station then transmits the data from the buffer to the UE with a predefined MCS, without regard to the received channel quality reports.

Still further, disclosed is a base station that includes an antenna structure configured to wirelessly communicate with UEs served by the base station, and including a controller configured to carry out various functions such as those described above. For instance, the controller may be configured to buffer data to be transmitted via the antenna structure to a given UE and to dynamically select an MCS for transmission of the data to the UE, with the dynamic selection being based at least in part on wireless channel quality reported to the base station by the UE. Further, the controller may be configured (i) to determine that the UE is going to stop being served by the first base station, such as that the UE is going to hand over to another base station, and (ii) responsive to determining that the UE is going to stop being served by the first base station, to select a predefined MCS for transmission of data to the UE, where selecting of the predefined MCS is done without regard to wireless channel quality reported to the base station by the UE.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

This detailed description will focus on implementation in an LTE network by way of example. Those of ordinary skill in the art will appreciate, however, that the principles described can apply as well in the context of various other air interface protocols now known or later developed.

Referring to the drawings, as noted above, FIG. 1 is a simplified block diagram of a wireless communication system in which embodiments of the present disclosure can be implemented. As shown, the system includes at least two LTE base stations 12, 14 known as eNodeBs, each of which radiates to define at least one air interface coverage area 16, 18 in which to serve UEs, such as a representative UE 20. Each eNodeB then has an interface with a Serving Gateway (SGW) 22, which has an interface in turn with a Packet Gateway (PGW) 24 that provides connectivity with a packet-switched network 26 such as the Internet. Further, each eNodeB has an interface with a Mobility Management Entity (MME) 28, which functions as a signaling controller and to manage set up of bearer tunnels for transmission of data between the PGW and the eNodeBs. And the eNodeBs 12, 14 also have an X2 interface with each other. Although these various network elements are shown with direct interconnections, a typical LTE network would provide the elements instead as nodes on a packet-switched network, such as a wireless service provider's core packet network, in which case the various illustrated connections represent logical communication paths between the elements over that network.

Figure 1:
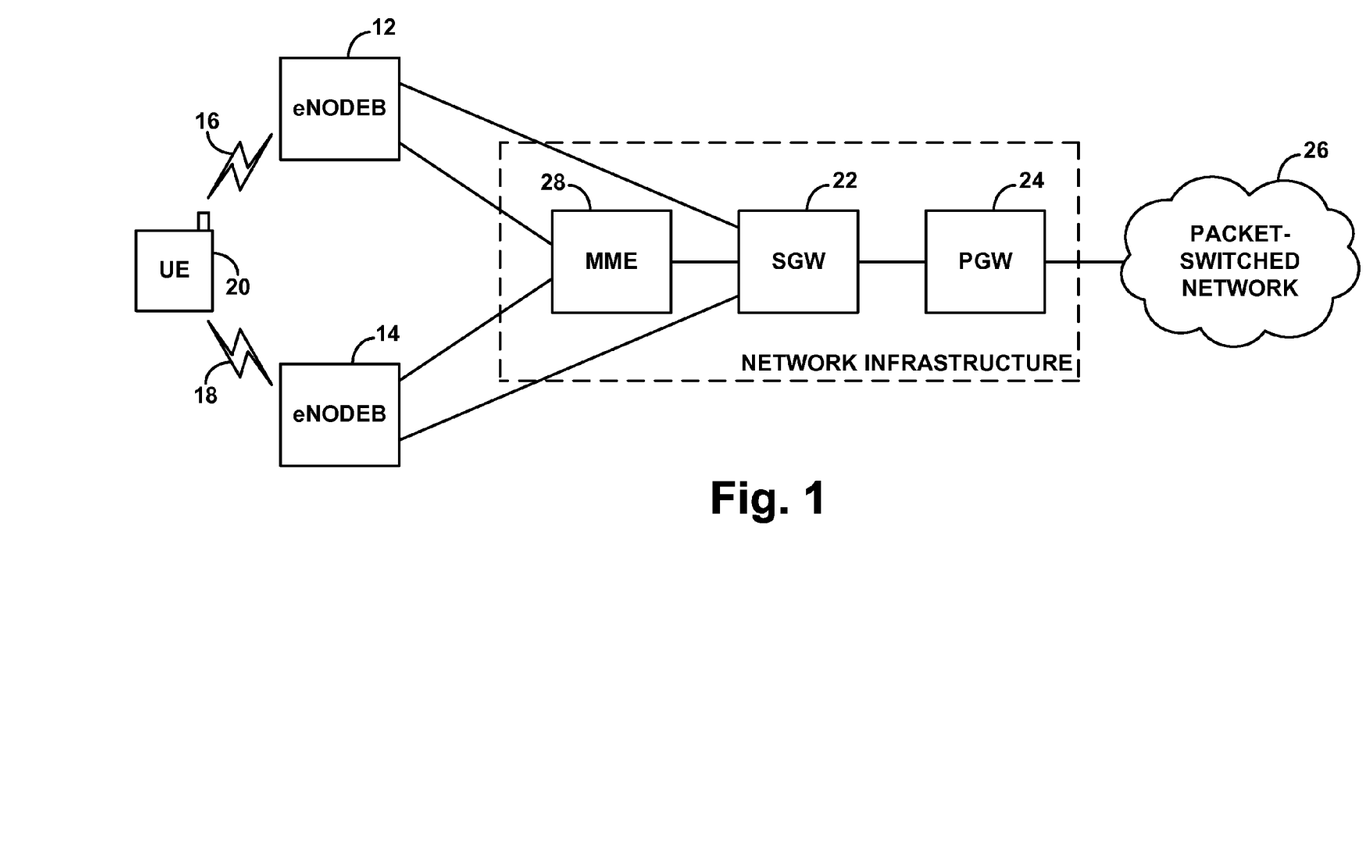
FIG. 1 is a simplified block diagram of a wireless communication system in which embodiments of the disclosure can be implemented.

In practice with this arrangement, when a UE enters into coverage of a given eNodeB, the UE may detect a sufficiently strong reference signal from that eNodeB and may transmit to the eNodeB an attach request, seeking to connect with the eNodeB. Upon receipt of the attach request, the eNodeB may then pass the request to the MME, and the MME may responsively engage in signaling with the SGW (which in turn engages in signaling with the PGW) and with the eNodeB, in order to set up an end-to-end bearer connection for the UE. In particular, the MME may orchestrate setup of an access bearer extending between the eNodeB and the PGW and a radio bearer extending over the air between the eNodeB and the UE.

With those bearers set up, data may then flow from the packet-switched network to the UE. In particular, as the PGW receives packet data destined to an IP address of the UE, the PGW may transmit that data to the SGW, and the SGW may transmit that data to the eNodeB. The eNodeB may then process the incoming packet data as discussed above, passing the data through the PDCP, RLC, MAC, and physical layers and thus ultimately transmitting the data with an appropriate level of modulation over the air to the UE.

As noted above, in this process, the eNodeB may buffer the incoming data at various layers of the LTE stack. For instance, as data enters the RLC layer, the eNodeB may buffer (temporarily store in data storage) the data, pending transfer of the data to the MAC layer. In turn, as the data enters the MAC layer, the eNodeB may buffer the data in the MAC layer, pending transfer of the data to the physical layer, i.e., modulation for transmission over the air to the UE. This buffering may help to account for delays in physical transmission of the data over the air, compared with rate of receipt of the data from the SGW.

As further noted above, at the MAC layer, the eNodeB may apply an HARQ process in an effort to ensure successful receipt of the data at the UE. Thus, the data buffered at the MAC layer may be stored in an HARQ buffer as it is subjected to HARQ processing. In the HARQ process, the eNodeB may output a MAC PDU containing a data received from the RLC layer and may await receipt from the UE of a positive acknowledgement (ACK) or negative acknowledgment (NAK) indicating whether the UE received that data (e.g., as determined by a Cyclic Redundancy Check (CRC) at the UE). If the eNodeB receives a NAK or does not receive an ACK in sufficient time, the eNodeB then retransmits the data or a portion of the data with incrementally added error correction coding, to further help ensure successful receipt. And the eNodeB may then repeat this process a number of times, until either confirming successful receipt or deeming the transmission to have failed.

As additionally discussed above, as the eNodeB outputs successive transmissions onto the physical layer (e.g., successive MAC PDUs, possibly having varying extent of correction coding), the eNodeB may regularly select and apply various MCSs based on CQIs received from the UE. In practice, the UE may generate and transmit these CQIs to the eNodeB, with each CQI being a 4-bit integer based on observed signal-to-noise ratio, and possibly taking into account various UE capabilities such as number of antennas and type of receiver for instance. In current LTE implementations, the CQI values range from 1 to 15, so the UE may regularly evaluate channel quality, select the appropriate CQI value, and transmit that CQI value to the eNodeB. The UE may transmit these CQI values to the eNodeB periodically on an uplink control channel (Physical Uplink Control Channel (PUCCH)) and non-periodically along with outbound bearer data on an uplink traffic channel (Physical Uplink Shared Channel (PUSCH))).

Figure 2:
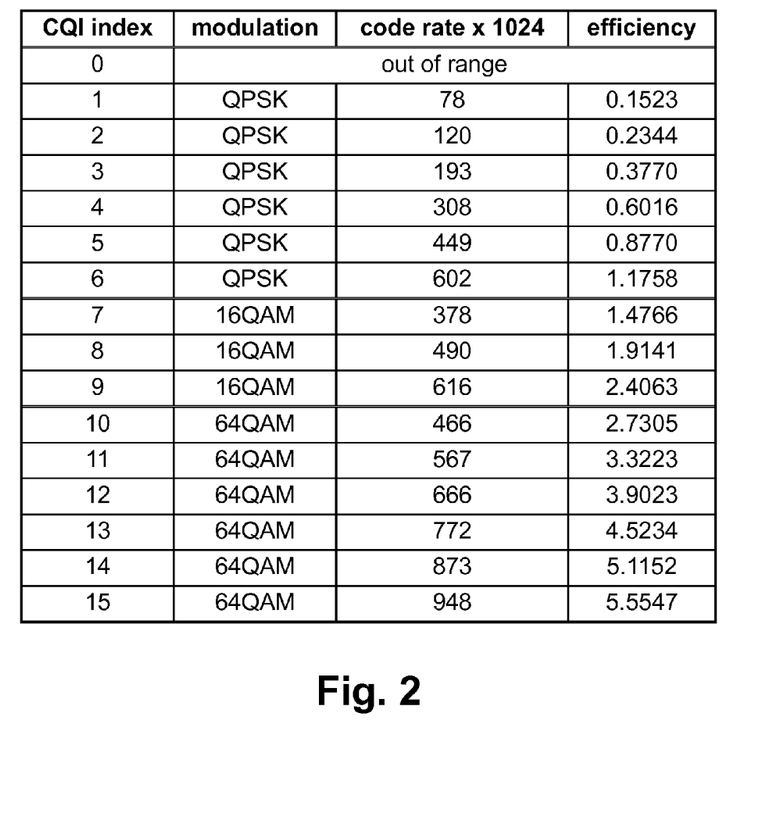
FIG. 2 is an example of a table mapping CQI to MCS.

In practice, the eNodeB then maintains or otherwise has access to a table that maps CQI values with MCSs, ranging from a lowest-level CQI value correlated with a lowest-order MCS to a highest-level CQI value correlated with a highest-order MCS. FIG. 2 depicts a such a CQI-MCS table, showing CQI indexes ranging from 1 up to 15 and MCSs correspondingly ranging from QPSK with a coding rate of 78/1024 up to a 64-QAM with a coding rate of 948/1024. In this table, each MCS is thus a combination of modulation type (e.g., ranging from a lowest-order modulation scheme of QPSK to a highest order modulation scheme of 64-QAM) and coding rate (e.g., ranging from 78/1024 to 948/1024), though in other examples the MCS could simply be the modulation type or could take still other forms. In general, lower-order modulation types tend to provide lower data rate but more reliable transmission in the face of noise, as compared with higher-order modulation types. The coding rates are then indications of what portion of the data stream is actually being used to transmit usable data, with lower coding rates typically corresponding with lower-order modulation.

Applying this table, the eNodeB may be configured to select an MCS for a next physical layer transmission based on the latest CQI that the eNodeB received from the UE. For example, if the latest CQI that the eNodeB received from the UE was CQI 5, the eNodeB would modulate the next physical layer transport block to the UE with QPSK at a coding rate of 602/1024. Whereas if the latest CQI that the eNodeB received from the UE was CQI 9, the eNodeB would modulate the next physical layer transport block to the UE with 16-QAM at a coding rate of 616/1024. In general, at issue in this process is just the most recently received CQI. In a variation, however, a most recent group of CQIs from the UE (e.g., averaged or otherwise functionally combined) could be considered to cooperatively represent the most recent report of channel quality from the UE.

Thus, in normal practice, the MCS used by the eNodeB for each successive air interface transmission to the UE may be based on the most recent CQI, or the most recent report of channel quality, that the eNodeB received from the UE, and perhaps on other factors as well.

As additionally discussed above, when a UE is connected with an eNodeB and receiving data from that eNodeB, the UE may also regularly monitor channel quality from other eNodeBs and, upon detecting another eNodeB with sufficiently strong signal strength, may request handover to that other eNodeB.

In the arrangement of FIG. 1, for instance, if the UE is currently served by eNodeB 12 and detects threshold signal strength from eNodeB 14, the UE may transmit to eNodeB 12 a measurement report indicating that the UE determined the handover threshold was met for eNodeB 14. In response, eNodeB 12 as a source eNodeB may then send a handover request via the X2 interface to eNodeB 14 as a target eNodeB, and eNodeB 14 may acknowledge that request. At that point, eNodeB 12 may then send a Radio Resource Configuration (RRC) connection reconfiguration request to the UE, providing the UE with mobility control information for the handover, and eNodeB 12 may send to eNodeB 14 a status transfer message. The UE may then send to eNodeB 12 an RRC connection reconfiguration complete message, and eNodeB 14 may work with the MME 28 to transfer the UE's bearer connection to extend to eNodeB 14 instead of to eNodeB 12. eNodeB 14 may then send a UE context release message to eNodeB 12, to complete the handover process.

Figure 3:
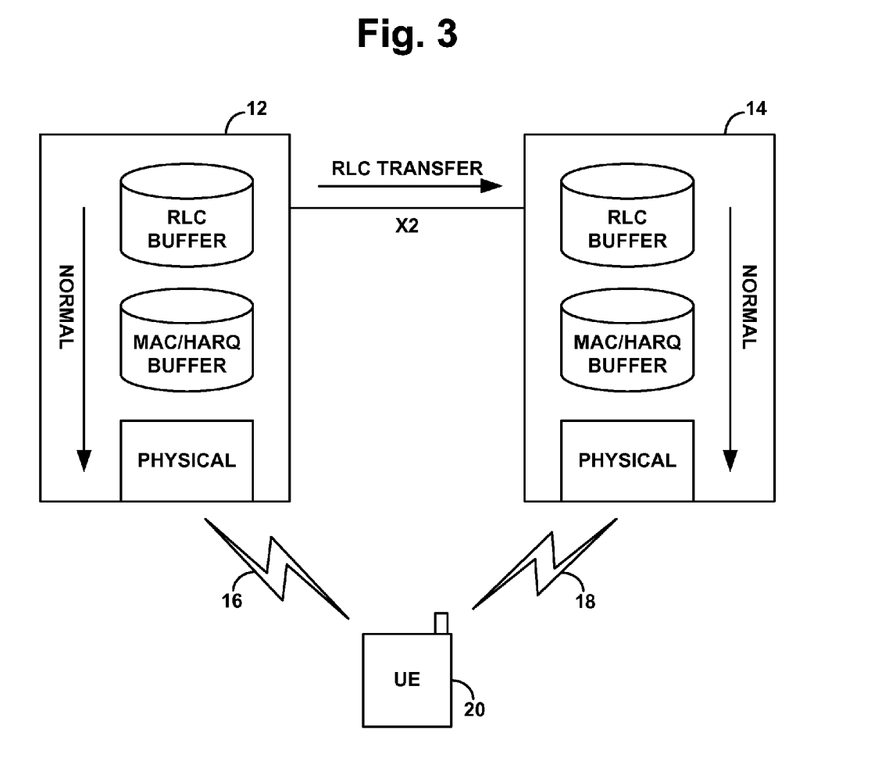
FIG. 3 is a simplified block diagram depicting example transfer of RLC buffered data from a source base station to a target base station.

As indicated above, during this handover process in LTE, the source eNodeB may transfer to the target eNodeB some of the data that it has received for transmission to the UE. In particular, eNodeB 12 may transfer to eNodeB 14 over the X2 interface the data that eNodeB has buffered at its RLC layer (i.e., in an RLC buffer) awaiting transfer to the MAC layer. FIG. 3 depicts this arrangement. As shown, both eNodeB 12 and eNodeB 14 are arranged to buffer received data in an RLC buffer, to then pass that data from the RLC layer down to a MAC layer, to buffer the data in a MAC/HARQ buffer, and to pass that data from the MAC layer to the physical layer for transmission over the air to the UE with a selected MCS. When the UE is going to hand over from being served by eNodeB 12 to being served by eNodeB 14, eNodeB 12 may transfer the RLC-buffered data over the X2 interface to the eNodeB 14, and eNodeB 14 may then similarly buffer that data and ultimately transmit it over the air to the UE. In the handover process described above, this X2 transfer of RLC-buffered data may occur just after eNodeB 12 sends the RRC connection reconfiguration message to the UE.

As noted, however, a problem can arise in this handover process, as data that has passed to the MAC layer of eNodeB 12 and is currently in the HARQ buffer may not be transferred to eNodeB 12 during the handover process. Consequently, that data could be lost if it does not arrive at the UE successfully before the UE transitions from being served by eNodeB 12 to being served by eNodeB 14.

The present method helps to overcome this problem by having the source eNodeB automatically apply a low-order (perhaps lowest-order) MCS for transmission to a UE when the source eNodeB determines that a UE is going to stop being served by the eNodeB, such as in response to determining that the UE is going to hand over from being served by the eNodeB to being served by another eNodeB. The source eNodeB may conveniently begin doing this in response to receiving the measurement report from that triggers the eNodeB to send a handover request to the target eNodeB, such as by starting to do this right after sending the handover request to the target eNodeB for instance.

By switching to use a low-order MCS rather than the MCS that the eNodeB associates with the channel quality most recently reported by the UE, the eNodeB may increase the likelihood that the HARQ-buffered data will successfully reach the UE before the handover occurs and may thereby help reduce the risk of lost data.

Figure 4:
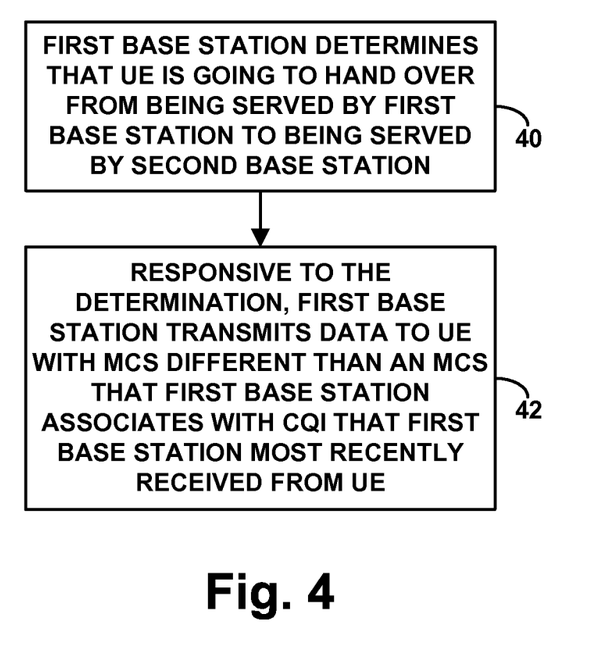
FIG. 4 is a flow chart depicting functions that can be carried out in accordance with the present disclosure.

FIG. 4 is next a flow chart depicting functions that can be carried out by a base station ("a first base station") such as eNodeB 12 in accordance with a representative method. As shown in FIG. 4, at block 40, the first base station determines that a UE is going to hand over from being served by the first base station to being served by a second base station. At block 42, in response to making that determination, the first base station then transmits data to the UE with an MCS different than an MCS that the first base station associates with a CQI that the first base station most recently received from the UE.

In this process, the act of determining that the UE is going to hand over from being served by the first base station to being served by the second base station may involve receiving from the UE a measurement report message indicating that a signal that the UE received from the second base station met a predefined handover threshold. Further, in line with the discussion above, the first base station may additionally respond to the determination by transmitting a handover request to the second base station and may thereafter begin to transmit the data to the UE with the MCS that is different than the MCS that the first base station associates with a CQI that the first base station most recently received from the UE.

Also in line with the discussion above, the first base station may maintain a table that associates CQIs with MCSs, ranging from a lowest CQI associated with a lowest-order MCS to a highest CQI associated with a highest-order MCS. In that case, the CQI most recently received from the UE may be other than the lowest CQI in the table, and the first base station may select from the table, as the MCS with which to transmit the data to the UE, an MCS that the table associates with a CQI lower than the CQI most recently received from the UE. More specifically, the MCS with which the first base station transmits the data to the UE may be the lowest-order MCS. For instance, using the table shown in FIG. 2, the MCS may be QPSK with a coding rate less than 0.08 (e.g., 78/1024).

Further in line with the discussion above, the data that the first base station transmits to the UE with the MCS different than the MCS that the base station associates with the CQI that the first base station most recently received from the UE may include data currently buffered in an HARQ buffer at the first base station. And the first base station may have additional data buffered in an RLC buffer for transmission to the UE, but the first base station may transfer that additional data to the second base station to facilitate transition of the UE from being served by the first base station to being served by the second base station.

Figure 5:
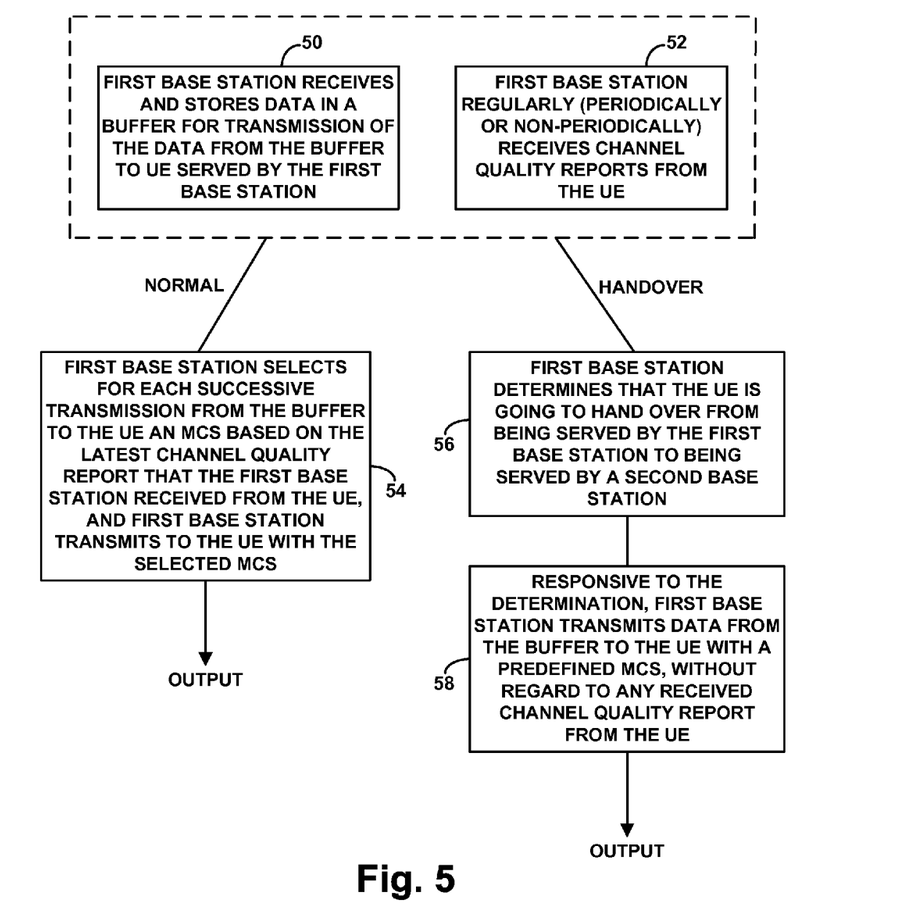
FIG. 5 is another flow chart depicting functions that can be carried out in accordance with the present disclosure.

FIG. 5 is next another flow chart depicting functions that can be carried out by a similar first base station in accordance with a representative method. As shown in FIG. 5, at block 50, the first base station receives and stores data in a buffer for transmission of the data from the buffer to a UE served by the first base station. Further, in parallel with this, at block 52, the first base station regularly (periodically or non-periodically) receives channel quality reports from the UE. In a normal mode of operation as shown as the left path in the figure, at block 54, the first base station then selects for each successive transmission from the buffer to the UE an MCS based on the latest channel quality report that the first base station received from the UE, and the first base station transmits to the UE with the selected MCS. On the other hand, as shown as the right path in the figure, at block 56, the first base station determines that the UE is going to hand over from being served by the first base station to being served by a second base station. In response to making that determination, at block 58, the first base station then transmits data from the buffer (e.g., all of the data from the buffer) to the UE with a predefined MCS, without regard to any received channel quality report from the UE.

Here again, the act of determining that the UE is going to hand over from being served by the first base station to being served by the second base station may involve receiving from the UE a measurement report message indicating that a signal that the UE received from the second base station met a predefined handover threshold. Further, the first base station may also respond to the determination by transmitting a handover request to the second base station and may thereafter begin to transmit the data from the buffer to the UE with the predefined MCS, without regard to the received channel quality reports.

Additionally, as with the example above, the first base station may similarly maintain a table that correlates various levels of channel quality with respective MCSs, ranging from a lowest level of channel quality correlated with a lowest-order MCS to a highest level of channel quality correlated with a highest-order MCS, and the normal selection of MCS at block 54 may be made by reference to that table, whereas the predefined MCS may be simply the lowest-order MCS for instance, such as QPSK with a coding rate less than 0.08. Moreover, the buffer may be an HARQ buffer, and the first base station may have additional data stored in an RLC buffer for transmission to the UE, in which case, responsive to the handover determination, the first base station may transfer the additional data from the RLC buffer to the second base station to facilitate transition of the UE from being served by the first base station to being served by the second base station.

Figure 6:
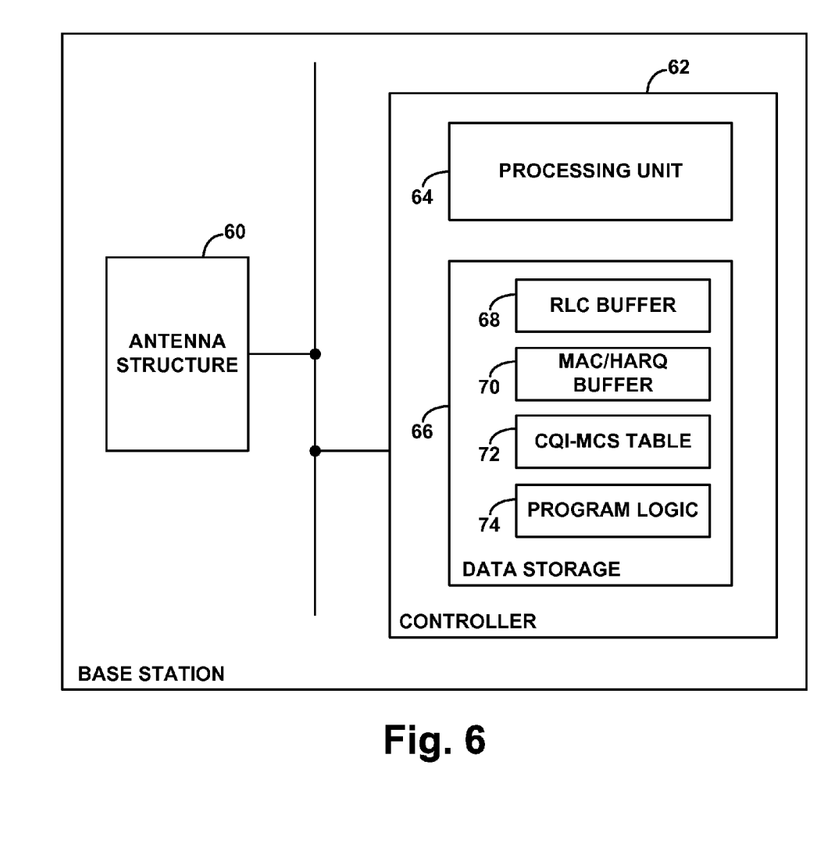
FIG. 6 is a simplified block diagram of an example base station operable to carry out a method in accordance with the disclosure.

Finally, FIG. 6 is a simplified block diagram of a base station, showing some of the components that may be include in a base station arranged to implement a method according to the present disclosure. As shown in FIG. 6, the example base station includes an antenna structure 60 and a controller 62. The controller may take any of a variety of forms, such as hardware including a processing unit 64 and non-transitory data storage 66. The processing unit 64 may comprise one or more general purpose processors (e.g., microprocessors) and/or one or more special purpose processors (e.g., digital signal processors), and the data storage 66 may comprise one or more volatile and/or nonvolatile storage components, such as magnetic, optical, or flash storage for instance.

As shown, the data storage 66 may function to define an RLC buffer 68 and an HARQ buffer 70 as discussed above. Further, the data storage 66 may hold a table 72 that maps channel quality to MCS as discussed above. The data storage 66 may then further hold 74 program logic executable by processing unit 64 to carry out various functions described herein. By way of example, in line with the discussion above, the functions may include buffering data that is to be transmitted via the antenna structure to a given UE and dynamically selecting an MCS for transmission of the data to the UE, with the dynamic selection being based at least in part on wireless channel quality reported to the base station by the UE. Further, the functions may include (i) determining that the UE is going to stop being served by the base station and (ii) responsive to determining that the UE is going to stop being served by the base station, selecting a predefined MCS for transmission of data to the UE, wherein selecting of the predefined MCS is done without regard to wireless channel quality reported to the base station by the UE.

As discussed above, the act of determining that the UE is going to stop being served by the first base station may involve determining that the UE is going to hand over to another base station. Further, buffered data may be buffered in an HARQ buffer, and the base station may have additional data for the UE buffered in an RLC buffer, which the base station may transfer to the other base station in response to determining that the UE is going to hand over to the other base station. And still further, the base station may use the a channel quality to MCS table 72 as a basis to dynamically select MCS, but the predefined MCS may be the lowest-order MCS in the table.

Exemplary embodiments have been described above. Those skilled in the art will understand, however, that changes and modifications may be made to these embodiments without departing from the true scope and spirit of the invention.

We claim:

1. A method comprising:
    a first base station determining that a user equipment device (UE) is going to hand over from being served by the first base station to being served by a second base station; and
    responsive to the determining, the first base station transmitting data to the UE with a modulation and coding scheme (MCS) different than an MCS that the first base station associates with a channel quality index (CQI) that the first base station most recently received from the UE.

2. The method of claim 1, wherein determining that the UE is going to hand over from being served by the first base station to being served by the second base station comprises receiving from the UE a measurement report message indicating that a signal that the UE received from the second base station met a predefined handover threshold.

3. The method of claim 1, further comprising:
    responsive to the determining, the first base station transmitting a handover request to the second base station and thereafter beginning to transmit the data to the UE with the MCS different than the MCS that the first base station associates with the CQI that the first base station most recently received from the UE.

4. The method of claim 1, further comprising:
    maintaining by the first base station a table that associates CQIs with MCSs, ranging from a lowest CQI associated with a lowest-order MCS to a highest CQI associated with a highest-order MCS,
    wherein the CQI most recently received from the UE is other than the lowest CQI, but the MCS with which the first base station transmits the data to the UE is the lowest-order MCS.

5. The method of claim 1, further comprising:
    maintaining by the first base station a table that associates CQIs with MCSs, ranging from a lowest CQI associated with a lowest-order MCS to a highest CQI associated with a highest-order MCS, wherein the CQI most recently received from the UE is other than the lowest CQI; and
    the base station selecting from the table, as the MCS with which to transmit the data to the UE, an MCS that the table associates with a CQI lower than the CQI most recently received from the UE.

6. The method of claim 1, wherein the MCS with which the first base station transmits the data to the UE comprises a modulation type and a coding rate, wherein the modulation type is quadrature phase shift keying (QPSK), and the coding rate is less than 0.08.

7. The method of claim 1, wherein the data that the first base station transmits to the UE with the MCS different than the MCS that the base station associates with a CQI that the first base station most recently received from the UE comprises data buffered in a hybrid automatic repeat request (HARQ) buffer.

8. The method of claim 7, wherein the first base station has additional data buffered in a radio link control (RLC) buffer for transmission to the UE, the method further comprising:
the first base station transferring the additional data from the RLC buffer to the second base station to facilitate transition of the UE from being served by the first base station to being served by the second base station.

9. The method of claim 1, wherein the first base station transmits the data to the UE over an orthogonal frequency division multiple access (OFDMA) air interface.

10. A method comprising:
a first base station receiving and storing data in a buffer for transmission of the data from the buffer to a user equipment device (UE) served by the first base station;
the first base station regularly receiving channel quality reports from the UE, and, for each of a plurality of sequential transmissions to the UE from the buffer, the first base station applying a modulation and coding scheme (MCS) selected by the first base station based on a latest such channel quality report;
the first base station determining that the UE is going to hand over from being served by the first base station to being served by a second base station; and
the first base station transmitting the data from the buffer to the UE, wherein, responsive to the determining, the transmitting is with a predefined MCS, without regard to any of the received channel quality reports.

11. The method of claim 10, wherein determining that the UE is going to hand over from being served by the first base station to being served by the second base station comprises receiving from the UE a measurement report message indicating that a signal that the UE received from the second base station met a predefined handover threshold.

12. The method of claim 10, further comprising:
responsive to the determining, the first base station transmitting a handover request to the second base station and thereafter beginning to transmit the data from the buffer to the UE with the predefined MCS, without regard to the received channel quality reports.

13. The method of claim 10, further comprising:
the first base station maintaining a table that correlates various levels of channel quality with respective MCSs, ranging from a lowest level of channel quality correlated with a lowest-order MCS to a highest level of channel quality correlated with a highest-order MCS; and
the first base station referring to the table to select the MCS for each sequential transmission to the UE from the buffer,
wherein the predefined MCS is the lowest-order MCS.

14. The method of claim 13, wherein the predefined MCS comprises quadrature phase shift keying (QPSK) with a coding rate of less than 0.08.

15. The method of claim 10, wherein the buffer is a hybrid automatic repeat request (HARQ) buffer, and wherein the first base station has additional data stored in a radio link control (RLC) buffer for transmission to the UE, the method further comprising:
responsive to the determining, the first base station transferring the additional data from the RLC buffer to the second base station to facilitate transition of the UE from being served by the first base station to being served by the second base station.

16. The method of claim 10, wherein transmitting the data from the buffer to the UE with the predefined MCS, without regard to the received channel quality reports, comprises transmitting all remaining data from the buffer to the UE with the predefined MCS.

17. A base station comprising:
an antenna structure configured to wirelessly communicate with user equipment devices (UEs) served by the base station; and
a controller configured to buffer data to be transmitted via the antenna structure to a given UE and to dynamically select a modulation and coding scheme (MCS) for transmission of the data to the UE, wherein the dynamic selection is based at least in part on wireless channel quality reported to the base station by the UE,
wherein the controller is further configured (i) to determine that the UE is going to stop being served by the base station and (ii) to select an MCS for transmission of data to the UE, wherein, responsive to determining that the UE is going to stop being served by the base station, the MCS that the controller selects is a predefined MCS, selected without regard to wireless channel quality reported to the base station by the UE.

18. The base station of claim 17, wherein determining that the UE is going to stop being served by the base station comprises determining that the UE is going to hand over to another base station.

19. The base station of claim 18, wherein the buffered data is data buffered in a hybrid automatic repeat request (HARM) buffer,
wherein the controller is further configured to buffer in a radio link control (RLC) buffer additional data to be transmitted to the UE, and responsive to determining that the UE is going to hand over to the other base station, to transfer the additional data from the RLC buffer to the other base station to facilitate transition of the UE to being served by the other base station.

20. The base station of claim 17,
wherein, to dynamically select an MCS for transmission of the data to the UE based at least in part on wireless channel quality reported to the base station by the UE, the controller refers to a table that maps various channel quality levels to respective MCSs, ranging from mapping a lowest channel quality level to a lowest-order MCS to mapping a highest channel quality level to a highest-order MCS,
wherein the predefined MCS is the lowest-order MCS.

* * * * *